United States Patent [19]
Vogel

[11] 4,204,810
[45] May 27, 1980

[54] BI-DIRECTIONAL PUMP
[75] Inventor: John D. Vogel, Parma, Ohio
[73] Assignee: Tokheim Corporation, Fort Wayne, Ind.
[21] Appl. No.: 738,589
[22] Filed: Nov. 3, 1976
[51] Int. Cl.² .......................... F04D 1/08; F01D 9/02; H02K 3/18; H02K 3/52
[52] U.S. Cl. ................................ 417/244; 417/350; 415/210; 310/194; 310/214
[58] Field of Search .................. 417/355, 356, 423 R, 417/244, 371, 350; 415/209, 219 R, 210; 310/194, 214, 185, 259, 42

[56] References Cited
U.S. PATENT DOCUMENTS

| | | | |
|---|---|---|---|
| 1,739,000 | 12/1929 | Jorado, Jr. | 417/356 |
| 1,908,627 | 5/1933 | Moran et al. | 417/423 R |
| 2,121,073 | 6/1938 | Bothezat | 417/423 R |
| 2,485,408 | 10/1949 | Pezzillo | 417/356 |
| 2,537,310 | 1/1951 | Lapp | 417/357 X |
| 2,709,762 | 5/1955 | Naul | 310/259 X |
| 3,304,481 | 2/1967 | Saussele | 318/138 |
| 3,644,767 | 2/1972 | Kasargod | 310/194 X |
| 3,846,682 | 11/1974 | Massie | 318/138 |

FOREIGN PATENT DOCUMENTS

| | | | |
|---|---|---|---|
| 663950 | 5/1963 | Canada | 417/423 R |
| 1808122 | 5/1970 | Fed. Rep. of Germany | 417/423 R |
| 2024786 | 3/1971 | Fed. Rep. of Germany | 310/214 |

*Primary Examiner*—Leonard E. Smith
*Attorney, Agent, or Firm*—David A. Lundy

[57] ABSTRACT

A bi-directional pump having a pump housing, an inlet communicating with one end of the housing, an outlet communicating with the other end of the housing, an impeller within the housing adjacent the inlet, a baffle plate within the housing adjacent the outlet, a shaft extending through the inlet and journaled in the baffle plate, the impeller being secured to the shaft for rotation with the shaft, the impeller having vanes extending radially from the shaft both the impeller and the baffle plate and being spaced from the interior of the housing, whereby fluid flows through the inlet, radially outwardly of the impeller, radially inwardly of the baffle plate, and through the outlet. In a specific embodiment, a pump stage can be positioned on both sides of a motor, and the motor rotor and the impeller of each pump can be secured to the same shaft for rotation, the shaft being journaled in the baffle plates of the pump stages. In other specific embodiments, a plurality of pump stages can be positioned on either side of the motor or on both sides of the motor utilizing the same shaft for the motor rotor and the pump impellers.

45 Claims, 15 Drawing Figures

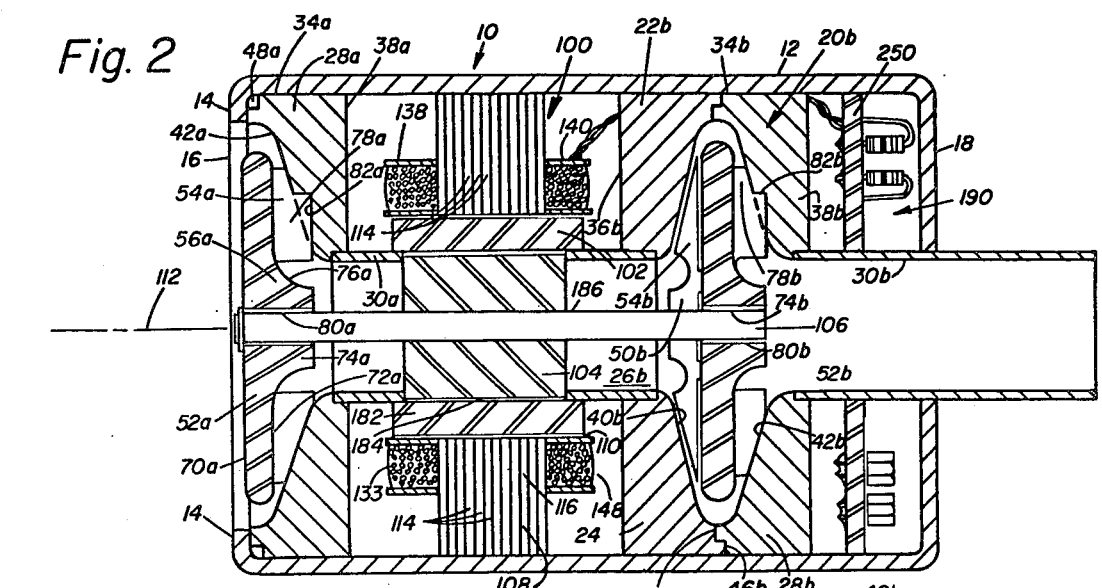
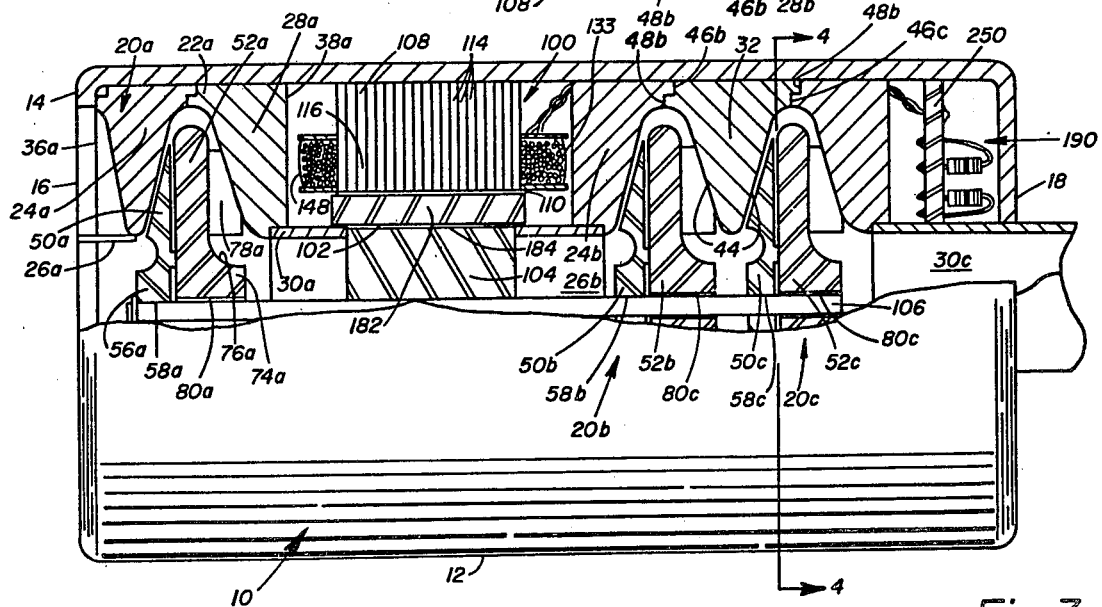
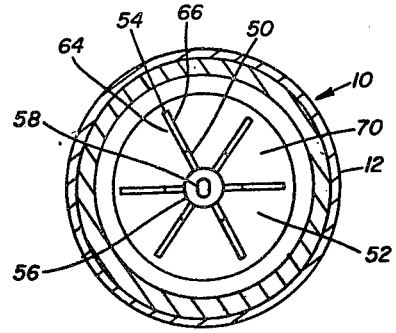

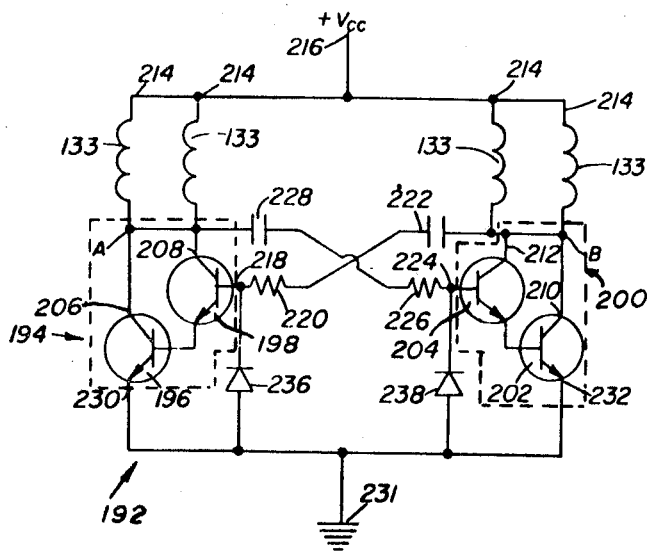
Fig. 9
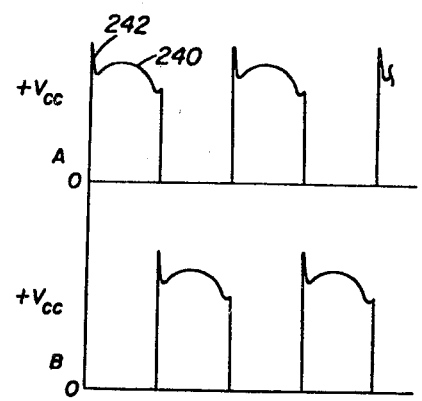
Fig. 10
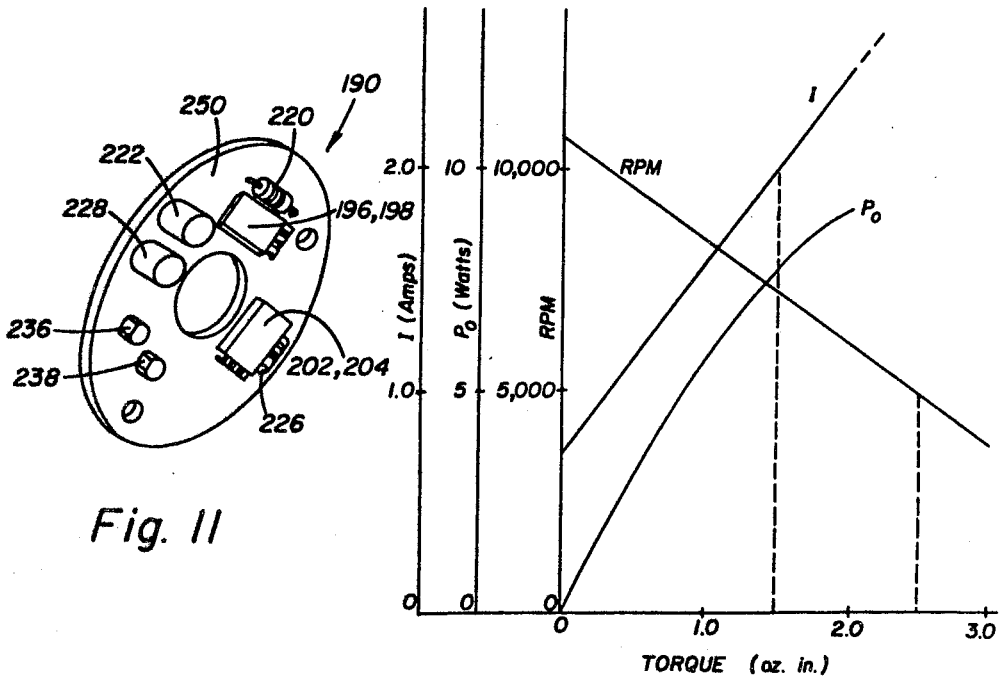
Fig. 11
Fig. 12

BI-DIRECTIONAL PUMP

CROSS-REFERENCE TO RELATED APPLICATION

The applicant is the applicant of a related application entitled "ELECTRIC MOTOR" Ser. No. 738,357, now U.S. Pat. No. 4,156,168 filed approximately at the same time as this application; both applications are assigned to the same assignee.

BACKGROUND OF THE INVENTION

The invention relates to pumps, and more particularly to a bi-directional, single stage or multi-stage pump, which has a number of unique advantages.

The prior art discloses a great variety of pumps. However, traditionally, pumps are designed for a particular use. Each use, traditionally, compels the use of a pump having different flow and head requirements. Many times pumps having more capacity than is required for the use are used simply because pumps having the right requirements are not available.

It is therefore highly desirable to provide a full range of pumps for a variety of uses. This is extremely difficult in manufacturing pumps, it being difficult to design a pump having the variety of flow and head requirements necessary. Pump manufacturers have long sought a unitized pump structure which can be easily assembled and is inexpensive to manufacture and which can be assembled with motors of different sizes as a single stage or a multi-stage pump as required.

In a number of uses, it is further highly desirable to provide pumps that are lubricated by the flow of fluid through the pump and/or to provide a pump-motor combination structure by which the motor is both cooled and lubricated by the flow of fluid through the pump.

SUMMARY OF THE INVENTION

Therefore it is an object of the invention to provide an improved pump structure.

It is another object of this invention to provide an improved unitized pump structure which can be relatively economically manufactured.

It is another object of this invention to provide an improved unitized pump structure which can be relatively inexpensively manufactured and used in both single stage and multi-stage pump structures.

It is another object of this invention to provide an improved unitized pump structure which when combined with a motor allows the impeller shaft bearings to act as supports for the motor rotor.

It is another object of this invention to provide an improved pump structure which provides an efficient flow of fluid through the entire pump assembly by inputting and exhausting fluid through the center thereof.

It is another object of this invention to provide an improved unitized pump and motor structure by which the motor stator, motor rotor, stator coils, pump parts and commutation circuit makes possible a family of complete pump units whose output characteristics can vary over a wide range.

It is another object of this invention to provide an improved pump and motor structure which can be stacked in a close fitting tube, the only fastening means required for the completed pump assembly being at the opposite ends of the tube.

Another object of this invention is to provide an improved bi-directional pump and motor structure allowing the use of a simple and economical electronic drive circuit.

Another object of the invention is to provide an improved motor structure having the ultimate in simplicity of construction and economy in the coil winding process.

Another object of this invention is to provide an improved motor structure having the ultimate in simplicity of construction and economy in the coil winding process, yet a highly efficient use of the available stator and coil area.

Another object of this invention is to provide an improved unitized motor structure by which a family of motors is possible whose output characteristics can vary over a wide range.

Another object of this invention is to provide an improved motor structure which is uniquely adapted for use in driving a pump.

It is another object of this invention to provide an improved motor driven pump having an efficient flow path for fluid through the pump, the motor and the commutation electronics, the flow maintaining the desired operational temperature of the motor and commutation electronics while achieving the desired pump efficiency.

It is another object of this invention to provide an improved motor structure by which the starting torque characteristics and the output characteristics are optimized.

It is still another object of this invention to provide an improved motor driven pump combination meeting all the objects stated hereinabove.

It is still further an object of this invention to provide an improved motor driven pump combination having all the objects mentioned hereinabove which is especially useful as an intank fuel pump for motor vehicles.

In the broader aspects of this invention, there is provided a pump having a housing with an inlet at one end thereof and outlet at the other end thereof. An impeller is mounted within the housing and secured to a shaft for rotation with the shaft. A baffle plate is mounted within the housing; the shaft is journaled in the center of the baffle plate. The fluid flow enters the housing by the inlet, and engages the vanes of the impeller flowing radially outwardly of the impeller, and then radially inwardly of the baffle plate and exits the outlet. The invention also provides an electric motor having both a stator and a rotor comprising a plurality of laminations of magnetic material, the stator having a generally cylindrical cavity therein in which the rotor assembly is mounted for rotation, a plurality of coil bobbins having a number of windings thereon commensurate with the number of laminations of the stator and rotor. The invention also provides a commutation circuit including a solid state switching circuit connected between the source of operating potential and the stator windings of the motor, and a control circuit by which the switching circuit is caused to switch in response to the rotational movement and position of the rotor with respect to the stator windings. The invention finally provides the combination of the above into a single compact and efficient pump structure which can be manufactured relatively easily and economically to provide a family of pump units whose output characteristics can vary over a wide range.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings wherein:

FIG. 2 is a cross-sectional view taken along a plane which includes the motor shaft axis of a single stage motor driven pump, illustrating the improved pump, the improved motor and improved commutation electronics of the invention;

FIG. 3 is a side view, partially broken away of the improved motor driven pump combination of the invention showing the improved motor, the improved commutation circuit of the invention and three separate stages of the improved pump of the invention;

FIG. 4 is a cross-sectional view of the motor pump combination illustrated in FIG. 3 taken substantially along the section line 4—4;

FIG. 9 is a circuit diagram of the electronic commutation circuitry of the invention;

FIG. 10 is a diagrammatic illustration of the wave form generated in the commutation circuitry of the invention;

FIG. 11 is a perspective view of the circuit board of the invention on which the commutation circuitry is mounted as shown in FIGS. 1 through 3;

FIG. 12 is a chart showing the performance characteristics of the improved motor structure of the invention;

DESCRIPTION OF THE SPECIFIC EMBODIMENT

Figure 1:
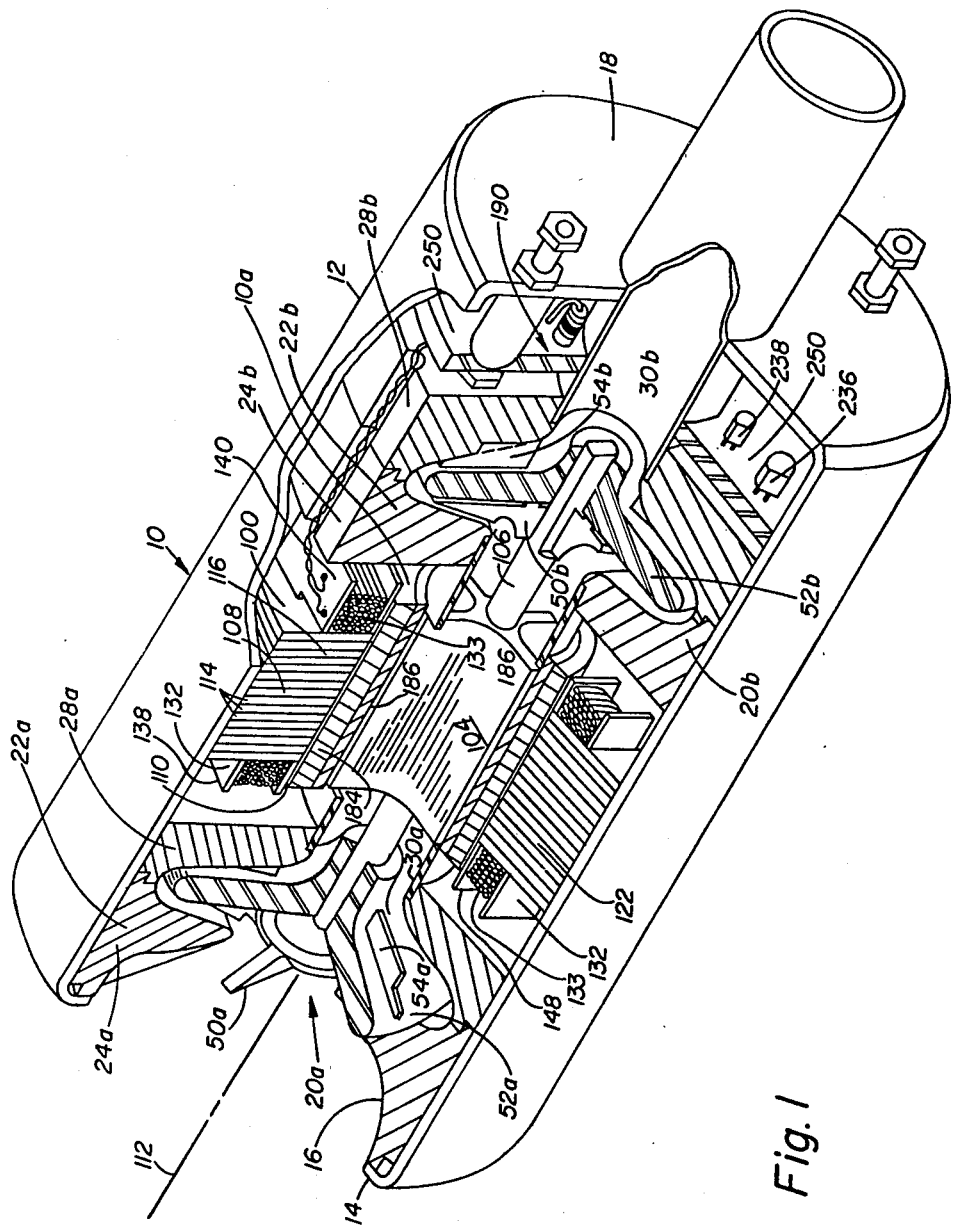
FIG. 1 is a perspective view, partially broken away, of the improved pump, the improved motor and improved commutation circuitry shown in combination as the improved motor driven pump combination of the invention, incorporating two pump stages.

Referring to the drawings, there is shown the improved motor driven pump combination of the invention. FIGS. 1, 2, and 3 respectively, illustrate two-stage, one-stage, and three-stage motor driven pump combinations; actually two or more pump stages can be positioned on both sides of the motor thereby providing plural stage motor driven pump combinations, all of which have the improved commutation circuitry of the invention. Since the commutation circuitry and each pump stage are identical in each of the motor driven pump combinations illustrated in FIGS. 1, 2, and 3, each will be described hereinbelow, separately, with the understanding that they can be used in the combination as illustrated in FIGS. 1, 2, and 3 or separately, for example, the motor and the commutation circuitry can be used alone and the improved pump of the invention can be driven by other motors not disclosed herein. Further, the improved motor structure of the invention is disclosed hereinbelow with the understanding that the motor structure can be used separately with conventional commutators or with the improved commutation circuitry of the invention, to drive the improved pump of the invention or to drive other motor driven units, not disclosed herein. Similarly, it should be noticed that the size of the stator, and the size of the rotor of the improved motor structure of the invention is larger in the three-stage motor pump combination illustrated in FIG. 3 than in the single stage motor pump combination illustrated in FIG. 2, and should be understood that the motor structure of the invention as disclosed herein can be varied, in view of the laminated structure of the stator and rotor to create a family of motors having a wide range of performance characteristics. As more power is required by the unit driven by the motor, both the size of the stator and the rotor are enlarged. As shown in the drawings, the various pump stages, motor and commutation electronics of the improved motor driven pump combination of the invention 10 can be assembled in a tubular housing 12 by stacking the same as shown in FIGS. 1, 2, or 3. The only fastening means required for the completed pump assembly is a roll over 14 on the opposite ends 16, 18 of the tubular housing 12, or only on end 16 as shown, or the like.

THE PUMP

Each pump stage 20 of the invention includes a pump housing 22 which in a specific embodiment is fabricated in two parts, a front part 24 having an inlet 26 therein and a back part 28 having an outlet 30 therein. In the three-stage motor pump combination illustrated in FIG. 3 and in all multi-stage pumps of the invention having three or more stages, the housing also includes an intermediate housing part 32. In the drawings, letters "a", "b" and "c" are added to the numerals identifying like structure to differentiate between different like structure, for example between like structure of different pump stages. Each housing part has a cylindrical exterior surface 34. Housing part 24 has a front planar surface 36 and housing part 28 has a rear planar surface 38. Front housing part 24 has an interior surface 40, rear housing part 28 has an interior surface 42. These surfaces 40 and 42 will be described hereinafter together with the opposite surfaces 44 of intermediate housing part 32. Adjacent the inner periphery of a front housing part 24 is a lip 46, and adjacent the inner periphery of the rear housing part 28 is a lip 48. Lips 46 and 48 are complementary to each other so that when the housing parts are placed together, lips 46 and 48 mate forming a liquid-tight seal therebetween. Intermediate housing part 32 has at its peripheries, a lip 46 on one side thereof and a lip 48 on the other side thereof as shown in FIG. 3. By the structure above described housing parts 24, 28 and 32 may be provided and assembled to provide a complete pump housing, cylindrical in shape, for single stage pumps and multi-stage pumps having a plurality of pump stages, as desired. Each housing has opposite ends 36, 38 an outlet 30 in end 38 and an inlet 26 in end 36.

Within the housing there is an impeller 50 and a baffle plate 52. Impeller 50 is positioned adjacent to the inlet 26 and is provided with a plurality of vanes 54 which extend radially outwardly of the impeller 50. A hub 56 is located in the center thereof, the hub 56 having an opening 58 therein in which the motor shaft is positioned. Opening 58 and the motor shaft can be keyed or the impeller is otherwise secured to the motor shaft such that the impeller rotates with the shaft. The hub 56 and each vane 54 of the impeller have surfaces 60 which define a planar surface. Each vane 54 also has a surface 62 which defines a generally conical surface. Each of these surfaces will be mentioned hereinafter together with the interior surfaces 40 and 42 of the front housing section 24 and the rear housing section 28 hereinafter as the interior of the pump stage is described more fully. The opposite sides of each vane 64 and 66 are generally planar and parallel and extend generally normally to the surfaces 60 and 62.

Baffle plate 52 is located within the housing adjacent outlet 30. Baffle plate 52 has opposite planar surfaces 70 and 72. Located in the center of baffle plate 52 and extending outwardly from surface 72 is a hub 74. Hub 74 has an exterior cylindrical surface 76 which is fillited to merge smoothly with surface 72 and baffle plate 52. Extending radially of hub 74 and outwardly of surface 72 are a plurality of fixed vanes 78. Hub 76 has a bearing 80 therein in which the motor shaft is journaled. The interior surface 42 of rear housing part 28 includes radially extending slots 82 therein positioned to receive a portion of each of the vanes 78 thereby securing baffle plate 52 to the rear housing part 28, and yet spacing baffle plate 52 from the housing.

As shown in the drawings, and more specifically in FIGS. 1 through 3, 6 and 7, the interior of the housing of each pump stage is shaped in a particular manner. As stated hereinabove, front housing part 24 has an interior surface 40 and rear housing part 28 has an interior surface 42. These two surfaces are geometrically similarly shaped to provide an interior space which is identically shaped on both sides of a plane extending through the center of baffle plate 52 and perpendicular to the axis of the motor shaft. The space on each side of this plane is generally conical in shape, the apex of which being on the motor shaft axis at the inlet or outlet of the pump and the base being either surface 70 or 72 of baffle plate 52. Referring to FIGS. 1, 2, and 3, it is shown the conical surfaces 62 of impeller 50 are positioned in close tolerance with the interior surface 40 of the front housing part 24. Similarly, vane surfaces 60 are positioned in close tolerance with surface 70 of baffle plate 52. Both impeller 50 and baffle plate 52 are spaced from surfaces 40 and 42 of housing parts 24 and 28. The only portion of either touching housing parts 24 or 28, in any way, are the baffle plate vanes 78 which are inserted in the slots 82 as above mentioned. In general, the space on opposite sides of the baffle plate plane above mentioned can be mathematically defined as:

$$C = \int_{d_1}^{d_2} \int_{r_1}^{r_2} 2\pi r \Delta d \Delta r$$

where $r_1$ and $r_2$ is the radius at points 1 and 2 and $d_1$ and $d_2$ is the distance measured perpendicularly from surface 70 to surface 40 or from surface 72 to surface 42 at points 1 and 2, respectively, and where C is a constant. The same can be said for the space within a multi-stage housing as shown in FIG. 3. The space between baffle plate surface 72 and the surfaces 44 of the intermediate housing section 32 being geometrically identically shaped.

Figure 14:
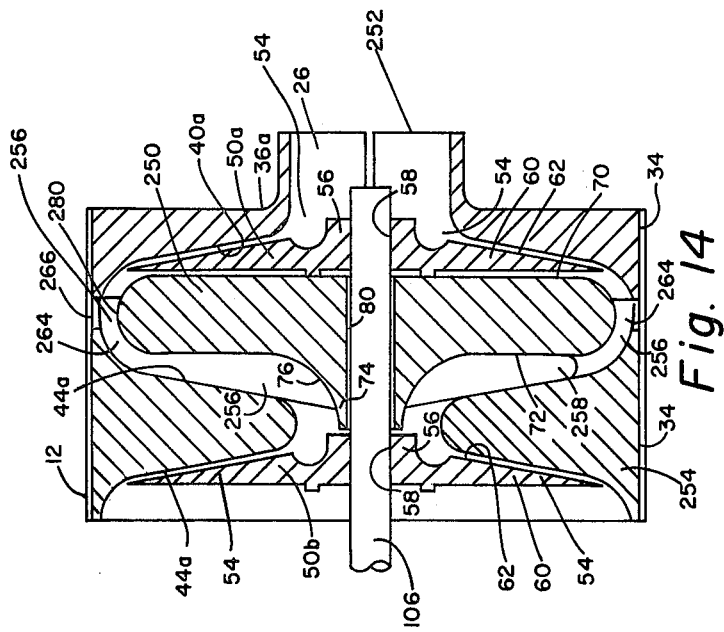
FIG. 14 is a fragmentary and cross-sectional view of a portion of a multi-stage pump of the invention showing the alternate baffle plate illustrated in FIG. 13 together with alternate front and intermediate housing parts, taken substantially along the section line 14—14 of FIG. 13.
Figure 13:
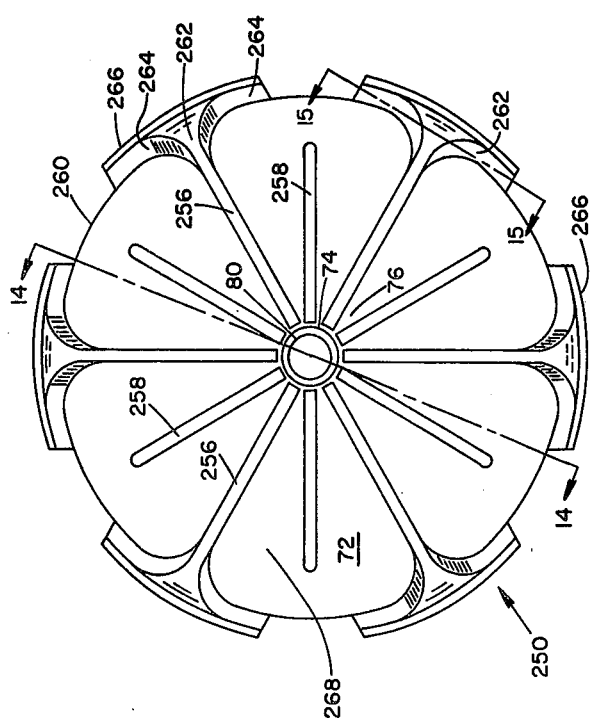
FIG. 13 is a rear view of an alternate baffle plate useful in the improved pump of the invention.
Figure 15:
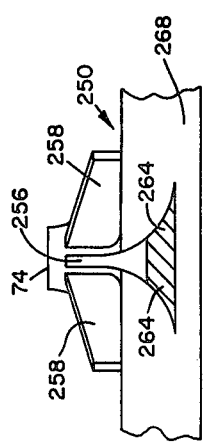
FIG. 15 is a cross-sectional view of the baffle plate illustrated in FIG. 13, taken substantially along the section line 15—15 of FIG. 13.

Referring now to FIGS. 13 through 15 there is shown an alternate pump structure having alternate baffle plate 250 taking the place of baffle plate 52 above described, an alternate front and back housing parts 252 taking the place of front and back housing parts 24, 28 above described and an alternate intermediate housing part 254. Taking the place of intermediate housing part 32 above described, both front and back housing parts 252 are identical. Both front and back housing parts 252 and intermediate housing part 254 are of a cylindrical geometry; and thus, all structure viewed in front and rear views appear as circles. For this reason, only cross-sectional views of parts 252, 254 are shown. As will become apparent by the disclosure herein, housing parts 252, 254 are similar in many respects to housing parts 22, 24 and 28.

Baffle plate 250 is also similar to baffle plate 52. In the drawing, like elements are given like reference numerals. Plate 250 includes a plurality of radially extending fixed vanes 256, 258, a central hub 74 having a bearing 80 fixed therein, and opposite, generally planar, surfaces 70, 72. Vanes 256 extend from surface 72 and radially beyond the circumferential edge 260 of body 262 of plate 250. The radially extending distal ends 264 of vanes 260 are provided with flow-guiding portions 266 which are curved in a generally circumferential direction so as to extend generally toward adjacent vanes 262 both in clockwise and counter-clockwise direction with respect to the axis of plate 250. Vanes 258 also extend from surface 72 and are positioned between each of the vanes 256 but only extend radially to a position spaced from edge 260. The radially distal surfaces 268 of ends 262 are arcuate and dimensioned to have the same outside diameter as pump housing 22.

The alternate baffle plate 250, front and back housing parts 252 and intermediate housing part 254 give the pump of the invention at least two distinct advantages. First, the baffle plate 250 improves the flow of fluid from the impeller 50 and side 70 of baffle plate 250 to the opposite side 72 thereof. Surfaces 266 of vanes 256 and the interior surfaces 40, 42, 44 of housing parts 252, 254 function to change the direction of the flowing fluid from an essentially circumferential direction adjacent distal ends 262, to pass over the circumferential edge 260, and to a radial flow between the vanes 256 and 258 of the plate 250 toward the hub 74. It can readily be seen that the impellers 50 impart rotary motion to the fluid as the fluid moves radially thereof; and thus, the fluid flow adjacent the circumference of either baffle plate 52 or 250 must change in direction and flow radially downwardly adjacent to the surface 72 between the vanes 78, 256, 258, respectively. Baffle plate 250 changes the direction of flow more efficiently than baffle plate 52. The symetrical shape of portions 266 maintains the bi-directional characteristic of the pump.

Second, the distal surfaces 266 radially engage the pump casing 12 and the distal ends 262 are sandwiched between front and back housing parts 252, in a single stage pump, or between housing parts 252 and intermediate housing portion 254, in a multi-stage pump as illustrated in FIG. 14. Inasmuch as the distal ends 262 extend to the casing 12, the entire lip structure including lip 46, 48, disclosed hereinabove, with regard to housing parts 24, 28, and 32 and the entire baffle positioning vane and slot structure including vane slots 82 are completely eliminated. Instead, the baffle plate 250 is positioned by its engagement with the housing 12, not by the positioning of a portion of vanes 78 in the slots 82.

THE MOTOR

The motor of the invention is shown to include a stator core assembly indicated generally by numeral 100 and a rotor assembly including a permanent magnet rotor 102 (to be described in detail below) a rotor web 104, and a shaft 106. The stator assembly 100 includes a stator core 108 of generally cylindrical configuration and having therethrough a generally cylindrical rotor cavity 110 having an axis 112.

Core 108 is formed from a plurality of core laminations 114, each lamination 114 being of substantially identical axial cross-section. As can best be seen in FIGS. 2 and 3, the number of laminations 114 can be selectively varied to provide a core 108 of selected axial length.

Figures 5, 6:
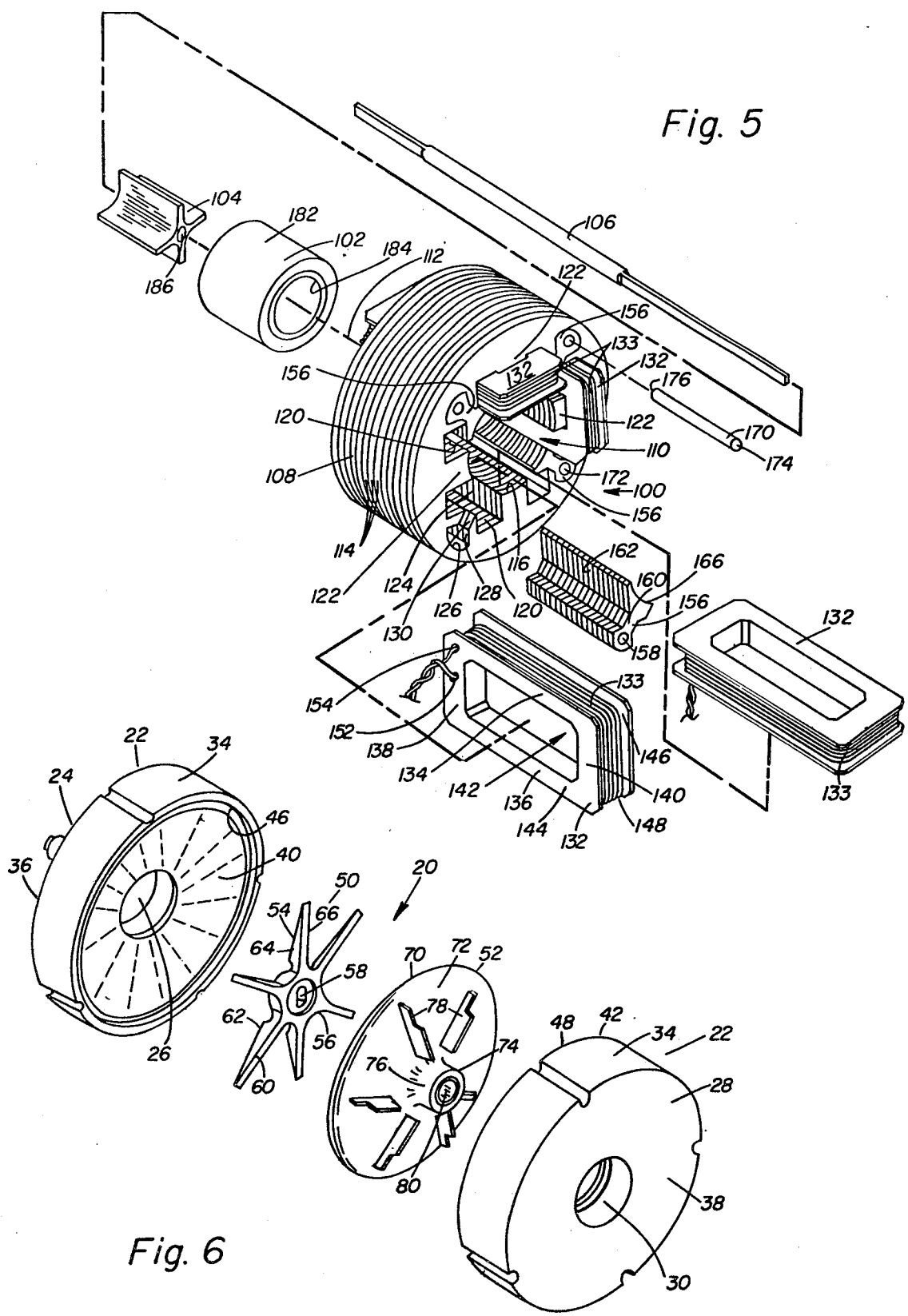
FIG. 5 is a perspective and partially exploded view of the improved motor structure of the invention.
FIG. 6 is a perspective and exploded view of the improved pump structure of the invention.
Figure 7:
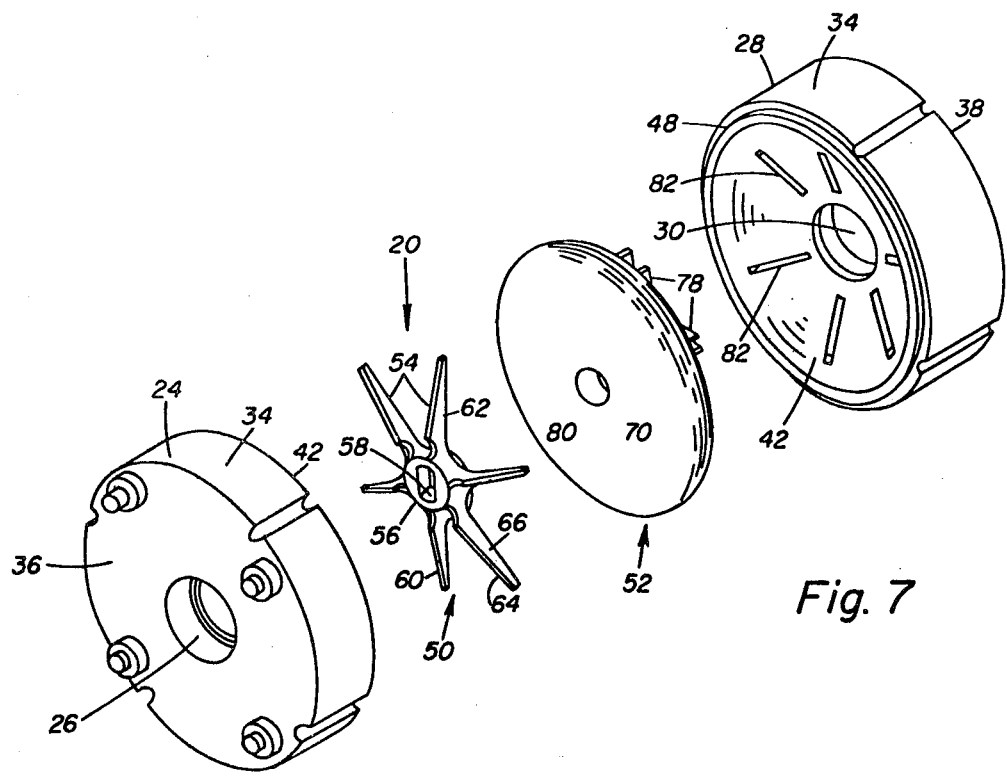
FIG. 7 is a perspective and exploded view of the improved pump structure of the invention showing the opposite side of the elements of the pump shown in FIG. 6.
Figure 8:
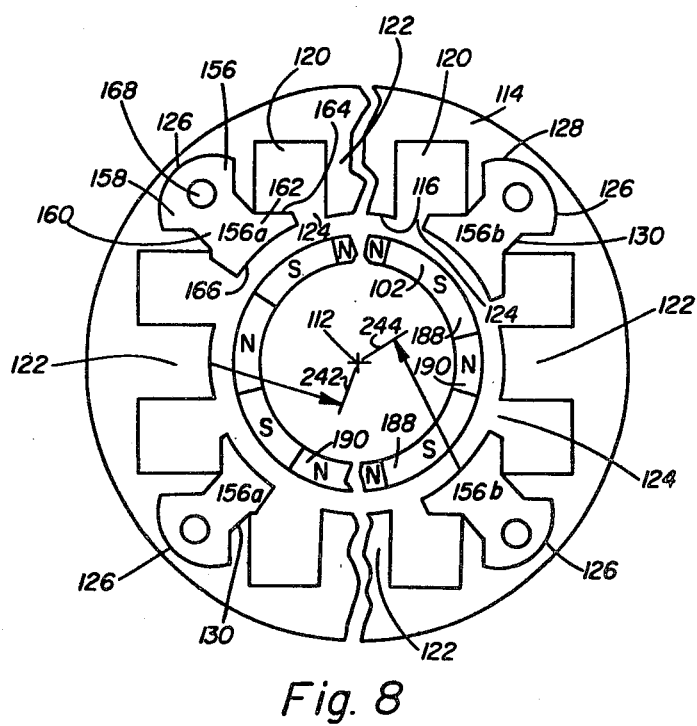
FIG. 8 is a perspective and partially exploded view of the improved motor structure of the invention, diagrammatically illustrating the starting torque characteristics thereof.

Referring specifically to FIGS. 5 and 8, core 108 has formed in the wall 116 of cavity 110 a plurality of coil recesses as at 120, recesses 120 being provided in pairs and extending in directions parallel to axis 112, whereby each pair of recesses 120 defines therebetween a pole element 122 which extends radially inwardly toward axis 112.

Recesses 120 having a generally rectangular configuration in axial cross-section, and the ends 124 thereof dispose inwardly toward axis 112 are open.

Formed between each pair of coil recesses 120 is a pole shoe recess 126. Recesses 126 again extend generally parallel to axis 112 and extend generally radially outwardly with respect to cavity wall 116. Recesses 126 are provided with an enlarged retaining portion 128 and a relatively smaller neck portion 130. A plurality of coil bobbins 132 are provided, each bobbin 132 having a generally rectangular configuration including side portions 134, 136, end portions 138, 140, a central opening 142 and peripheral flanges 144, 146 laterally spaced-apart to define therebetween a circumferential recess 148.

Opening 142 is again generally rectangular and bobbins 132 are dimensioned such that they can be inserted into cavity 110 and radially slidably positioned in a selected pair of recesses 120 in a position wherein it bounds the corresponding pole element 122 the latter extending through opening 142. The lateral spacing between side portions 134, 136 is generally constant for motors of any selected capacity (torque) while the length of the side portions 134, 136 can be selectively varied to provide bobbins of different lengths for use with cores of correspondingly different lengths as can best be seen in FIGS. 2 and 3.

A plurality of turns of magnet wire are wound circumferentially on the bobbins 132, the turns being received in the peripheral recess defined by flanges 144, 146 informing pole coils 133. The respective ends of the turns exit from bobbins 132 through appropriate through holes 152, 154, formed in the ends 138 of the bobbins 132. The number of turns of magnet wire wound on the bobbins 132 can be selectively altered to provide pole coils 133 of selected strength.

A plurality of pole shoes 156 are provided, pole shoes 156 including a retaining portion 158, a neck portion 160, and a shoe portion 162. Retaining portion 158 and neck portion 160 have cross-sections complementary to the enlarged and neck portions, respectively, of recesses 126 whereby shoes 156 can be slidably received into recesses 126 in a direction generally parallel to axis 112. It will be observed that by reason of the shape of the retaining and neck portions of the pole shoes 156, the pole shoes are radially, interlockingly engaged with the core 108. Preferably, pole shoes 156 are dimensioned such that they can be press fitted into the recesses 126 thereby frictionally maintaining them in their installed positions.

As can best be seen in FIG. 8, the shoe portions 162 of pole shoes 156 include a radially outwardly disposed surface 164 which at least partially overlies the open end 124 of recesses 120. Thus, when coils 133 have been positioned in the recesses 120 such that they bind the pole elements 122, the pole shoes 156 can be inserted into their respective recesses 126 and the surfaces 164 thereof will positively retain the coils 133 in their installed positions. It will further be observed that the radially inwardly disposed surfaces 166 of pole shoes 156 are coextensive with the cylindrical cavity 110 such that surfaces 166 define a portion of the wall thereof.

Each pole shoe 156 may further be provided with a small cylindrical hole 168 extending through the head portion 158 thereof. Holes 168 frictionally receive therein suitable pins 170. Pins 170 function to secure the individual laminations 171 of the pole shoes together prior to their insertion into the core 108. Preferably, pins 170 have a length dimension slightly shorter than the assembled length dimension of the pole shoes 156 whereby, when pins 170 are inserted therethrough, there remain shall, cylindrical indentations as at 172 defined by the ends 174, 176 and the end portions of holes 168. These indentations 172 provide a means for aligning externally mounted driven devices, such as the fuel pump illustrated with the motor core assembly 110.

Referring still to FIGS. 5 and 8, rotor 102 may be fabricated with an outer shell 182 made from a suitable ceramic magnet material formed in the shape of a hollow cylinder. A mettalic supporting shell 184 is frictionally received coaxially within the magnetic shell 182, shells 182 and 184 forming the hollow, cylindrical rotor 102. As best seen in FIG. 8, magnetic shell 182 is selectively magnetized by conventional means to have a plurality of magnetic sectors 188, 190 of alternating north and south polarity.

Frictionally received within shell 184 is web 104 which may be fabricated from a suitable material such as nylon, web 104 functioning as the hub for rotor 102. A cylindrical hole 186 is formed through the axial center of web 104 and a rotor supporting shaft 106 is frictionally received therein. Shaft 106 is substantially longer than core assembly 100 or rotor 102 to permit coupling of the rotor to a driven device such as the pump more fully described hereinabove. Further, shaft 106 may be rotatably mounted in the bearings of the externally driven device such as the pump thereby obviating the need for separate bearing assemblies for the rotor itself.

THE COMMUTATION CIRCUIT

The commutating means comprises, in general, a free-running multivibrator 192 which is an oscillatory circuit consisting of two active devices. In the specific embodiment illustrated, the active devices of the multivibrator 192 comprise a first 194 and a second 200 switching circuits. The first switching circuit 194 includes a "darlington" connected pair of transistors 196 and 198. The second switching circuit 200 similarly includes a "darlington" connected pair of transistors 202 and 204.

The multivibrator 192 further includes a series connected resistor 220 and capacitor 222 through which positive feedback is given from the collector 208 of the transistor 198 to the base 224 of the transistor 204. The multivibrator 192 also includes another series connected resistor 226 and the capacitor 228 through which positive feedback is given from the collector 212 of the transistor 204 to the base 218 of the transistor 198. The emitters 230 and 232 of the transistors 196 and 202, respectively, are connected in common to ground. The multivibrator circuit 192 also includes a pair of clamping diodes 236 and 238 which are connected between the transistor bases 218 and 224, respectively, and ground.

The commonly connected collectors 206 and 208 of transistors 196, 198 are connected to oppositely disposed pairs of coils 133. Similarly, the commonly connected collectors 210, 212 of transistors 202, 204 respectively are connected to the other oppositely disposed pair of coils 133. The opposite ends 214 of coils 133 are connected in common to a source of direct current operating potential 216 such as, for example, a battery.

The entire commutating means may be mounted on a single circular circuit board 250 which in turn is mounted coaxially with respect to the stator assembly 100 in a common housing with both the motor and the commutating means being mounted in a singular casing of constant and uniform diameter irrespective of the motor capacity as can be seen in FIGS. 2 and 3 wherein the motor is used in conjunction with the pump as more fully described hereinabove. All of the elements of the circuit are compactly mounted on the circuit board 250 and in the case of the pump shown on FIGS. 1, 2, and 3, cooling of the components may be effected by permitting fluid to engulf the circuit board 250. The terminal ends of the coil windings can be connected directly to appropriate terminals on the circuit board 250.

OPERATION

It will be observed that the operation of both the pump and motor is bi-directional, that is, both will operate identically when rotating both clockwise and counter-clockwise. Referring to the structure of the improved pump of the invention, the impeller is rotated as the motor shaft rotates. The fluid enters the inlet and engages the vanes of the impeller and is propelled radially outwardly of the impeller. Fluid flows over the periphery of the baffle plate 52 or 250 and radially inwardly of the baffle plate guided by the vanes 78, 256, 258. The fluid impinges upon the surface 76 of the hub 74 and is guided thereby out the outlet 30. As the fluid flows, because of the hereinabove disclosed shape of the space on opposite sides of the baffle plate, the fluid "views" the same area. That is, the area of cross-sections taken generally perpendicular to the direction of the flow of fluid, are about equal. The flow of the fluid through the motor driven pump combination of the invention functions to both lubricate the journals in which the motor shaft is supported for rotation and to cool both the motor structure and the commutation electronics. By this means, the desired operational temperature of the motor and commutation electronics is maintained while achieving the desired pump efficiency.

Referring to the motor and the commutating means of the invention, it will be recognized that the multivibrator 192 is a conventional free-running or astable multivibrator 192 with coils 133 of the motor stator being connected in the load circuits thereof. The frequency of oscillation of the multivibrator 192 is determined by the values of the capacitors 222, 228 and the resistors 220, 226 which comprise the resistor-capacitor network (series connected resistor 220 and capacitor 222, and series connected resistor 226 and capacitor 228). The values of the capacitors 222, 228 and the resistors 220, 226 are selected such that the square wave output of the multivibrator 192 has a frequency of oscillation, or switching, that is lower than the speed of rotation of rotor 102 at the normal operating speeds wherein one rotor revolution is considered as one cycle.

Under these conditions, it will be observed that coils 133 will be alternately, sequentially, and respectively energized in response to switching of the multivibrator circuit 192.

The energization of the coils 133 will in effect generate a magnetic field between the stator assembly 100 and the rotor 102 and the alternate, sequential and respective energizing of the coils 133 will cause the rotor 102 to rotate. The rotational speed of the rotor 102 is directly proportional to the frequency of the multivibrator 192, up to a limit as will be discussed below.

As the rotational speed of the rotor 102 increases, the magnetic sectors 88, 90 of the rotor 102 will begin generating counter voltages in the coils 133. The magnitude of the counter voltages increases with the rotational speed of the rotor 102. These counter voltages are generated in synchronism with the movement of the magnetic sectors 88, 90 past the poles 122.

These counter voltages, upon reaching a sufficient magnitude, will override the normal switching cycle of the multivibrator 192 produced by the resistor-capacitor network. This override will, in turn, cause the multivibrator 192 to begin oscillating in precise synchronism with the rotation of the motor rotor 102.

The actual voltages appearing at points A and B of the multivibrator are illustrated in FIG. 10. The values $V_a$ and $V_b$ are those voltages normally appearing at terminals A and B when the multivibrator 102 is oscillating under the influence of the resistor-capacitor network. Superimposed upon these "normal" voltages are the counter voltages as at 240 which include a preceding spike portion as at 242.

Under the conditions where the rotor magnetic sectors 88, 90 generate a counter voltage, the motor rotor 102 will continue to accelerate until it obtains an equilibrium speed which is established by the motor parameters and external load.

It would be noted that the wave form generated by the multivibrator 192 and superimposed counter voltages will be identical irrespective of the direction of rotation of the rotor 102. Therefore the motor will operate in either a clockwise or counter-clockwise direction. The actual direction of rotation will be determined either by the position of the rotor 102 when the motor is activated or by the influence of an external driven device.

Referring to FIG. 8, pole shoes 156 may be fabricated within asymmetrical configuration as at 156a. This asymmetrical configuration of the pole shoes will distort the magnetic flux pattern extending between the poles 122 and rotor 102 whereby the effective torque between the stator assembly 100 and rotor 102 will act along a lever arm 242 offset from axis 112. In this embodiment, it will be observed that the magnetic sectors of rotor 102 are substantially identically in circumferential dimension.

In the alternative, the pole shoes 156 can be fabricated with symmetrical cross-sections as at 156b. In this configuration, the magnetic sectors 188 and 190 of rotor 102 are formed of unequal or asymmetrical circumferential lengths. This again causes a distortion in the magnetic field between the stator assembly 100 and the rotor 102. This distortion in turn causes the force vector between the stator 100 and rotor 102 to operate along a lever arm 244 offset from the axis 112.

In both instances, both with the asymmetrical pole shoe 156a or the asymmetrical magnetic sectors of rotor 102, the starting torque of the motor is substantially improved.

Referring now to FIG. 12, there is illustrated a typical set of characteristic curves for a motor fabricated in accordance with the present invention and utilizing the commutation circuit of the invention, showing the torque relationship with respect to speed, power, and current. Those skilled in the art will recognize the motor characteristics as being similar to those of ordinary P-CV single phase electric motors.

Referring to FIG. 2, the operation of the improved motor driven pump combination of the invention will now be described. It should be understood that the only difference between the motor pump combinations illustrated in FIGS. 1, 2, and 3 are the number of pump stages, FIG. 1 illustrating two pump stages, FIG. 2 illustrating a single pump stage, and FIG. 3 illustrating three pump stages and the corresponding increased size of the motor stator, motor rotor, and coils 133 of the motor of the invention. It should also be understood that when a single pump stage is utilized, as illustrated in FIG. 2, a pump housing part 28 and a baffle plate 52 may be positioned adjacent the inlet of the motor pump combination as illustrated in FIG. 2 to provide a journal for the motor shaft. In all other motor pump combinations illustrated in FIGS. 1 and 3, the motor shaft is journaled in the baffle plates of the pump stages located on opposite sides of the motor.

Still referring to FIG. 2, the fluid enters the inlet, impinges upon the baffle plate 52, flows radially outwardly of the baffle plate and over the periphery thereof and radially inwardly of the baffle plate 52 guided by the vanes 78. The fluid then impinges upon the surface 76 of the hub 74 and is guided thereby out the outlet 30 and into the rotor web 14. The rotation of the rotor web 14 imparts motion to the fluid flowing therethrough. This fluid then impinges upon the impeller 50a, engages the vanes 54a thereof and is propelled radially outwardly of the impeller. The fluid flows over the periphery of the baffle plate 52a and radially inwardly of the baffle plate 52a guided by the vanes 78a thereof. The fluid then impinges upon the surface 76a of the hub 74a and is guided out the outlet 30a. Obviously, when a pump stage is located adjacent the inlet, as with the motor pump combinations, shown in FIGS. 1 and 3, the incoming fluid engages the impeller of the first pump stage rather than the baffle plate 52 of the motor pump combination illustrated in FIG. 2. It has been found that the motion imparted to the fluid passing through the motor rotor web 104 increases the efficiency of the motor pump combination of the invention.

It will further be observed that inasmuch as the motor will operate identically both in a clockwise and counterclockwise rotation, the cost of the motor is reduced by obviating the need for starting windings and the like. Because the motor does not incorporate the typical segmented copper commutator required in conventional direct current motors, a major wear factor in such motors is eliminated. Further, elimination of the segmented commutator produces a motor that is "sparkless" whereby it is safe for use in hazardous environment such as in the presence of volatile or explosive fuels and vapors. Efficiency of the motor is comparable to conventional commutator type motors.

Further, the unique arrangement of the coil assemblies utilizing bobbins of selectively different lengths and the provision of open ended coil recesses provides a motor which is ultimately simple and simple to assemble, this assembly obviating the need for conventional "stuffing" of coil windings. It further enables simple random winding of the pole coils on the bobbins prior to their assembly and facilitates handling thereof between the winding of the coils and their insertion. The coil bobbins are in turn simply and easily secured in position by the pole shoes 156. The motor of the configuration of the present invention has for example been found highly satisfactory for use, as described hereinabove, as a submersible fuel pump.

It should be understood that the motor of the invention, the pump of the invention, and the commutation circuitry of the invention can be used alone or together. For example, the motor, pump and commutation circuitry of the invention can be used together in combination as illustrated in FIGS. 1, 2, and 3. Also, the motor and the commutation circuitry can be used alone for driving devices other than the pump disclosed herein. Also, the improved pump of the invention can be driven by motors other than that disclosed herein. Further, the improved motor structure of the invention disclosed herein can be used with conventional commutators to drive either the pump of the invention or other driven devices.

By the invention, an improved pump structure, an improved motor structure, and improved commutation electronics are provided. Both the unitized pump structure and the unitized motor structure of the invention are relatively inexpensively manufactured and assembled. The improved pump structure and the improved motor structure make possible a complete family of pumps and motors and a complete family of improved motor driven pump combinations whose output characteristics vary over a wide range. The improved motor driven pump combinations of the invention provide for an efficient flow of fluid through the pump, the motor and commutation electronics, the flow maintaining the desired operational temperature of the motor and electronics while achieving the desired pump efficiency. The improved motor driven pump combinations of the invention provide a family of extremely useful intank fuel pumps for motor vehicles having output characteristics which can be selectively varied to meet all of the requirements of the various manufacturers of such vehicles.

While there have been described above the principles of this invention in connection with specific apparatus, it is to be clearly understood that this description is made only by way of example and not as a limitation to the scope of the invention.

What is claimed is:

1. A pump comprising a pump housing, said housing having opposite ends, an inlet in one of said housing ends, an outlet in the other of said housing ends, an impeller and a baffle plate within said housing, said impeller being between said inlet and said baffle plate, said baffle plate being between said outlet and said impeller, a shaft extending through said impeller, said shaft having one end thereof journaled in said plate, said impeller being mounted on said shaft for rotation in said housing with said shaft, means for connecting said baffle plate to said housing and spacing said baffle plate from said housing, said connecting and spacing means and baffle plate including means for changing the rotary motion of the fluid leaving said impeller into radially inwardly flow between said baffle plate and said outlet, said impeller being also spaced from said housing, whereby fluid flows into said inlet and engages said impeller adjacent the center thereof and flows radially outwardly of said impeller and over the periphery of and radially inwardly of said baffle plate and into said outlet, said baffle plate having opposite sides, one side thereof facing said impeller, the other side thereof facing said other housing end and said outlet, said changing means including a plurality of vanes extending from adjacent to said shaft radially outwardly therefrom, said vanes being positioned between said baffle plate and said other housing end, said vanes between said baffle plate and said other housing end being integral with said baffle plate, and said connecting and spacing means including slots in said housing and portions of said vanes positioned in said slots.

2. A pump comprising a pump housing, said housing having opposite ends, an inlet in one of said housing ends, an outlet in the other of said housing ends, an impeller and a baffle plate within said housing, said impeller being between said inlet and said baffle plate, said baffle plate being between said outlet and said impeller, a shaft extending through said impeller, said shaft having one end thereof journaled in said plate, said impeller being mounted on said shaft for rotation in said housing with said shaft, means for connecting said baffle plate to said housing and spacing said baffle plate from said housing, said connecting and spacing means and baffle plate including means for changing the rotary motion of the fluid leaving said impeller into radially inwardly flow between said baffle plate and said outlet, said impeller being also spaced from said housing, whereby fluid flows into said inlet and engages said impeller adjacent the center thereof and flows radially outwardly of said impeller and over the periphery of and radially inwardly of said baffle plate and into said outlet, said baffle plate having opposite sides, one side thereof facing said impeller, the other side thereof facing said other housing end and said outlet, said changing means including a plurality of vanes extending from adjacent to said shaft radially outwardly therefrom, said vanes being positioned between said baffle plate and said other housing end, said connecting and spacing means including distal end portions of said vanes, said distal end vane portions being between said baffle plate and said housing, said distal end portions of each said vanes including a curved surface extending from the vane to adjacent said housing, said curved surfaces of said vanes facing the direction of rotation of said impeller.

3. A pump comprising a pump housing, said housing having opposite ends, an inlet in one of said housing ends, an outlet in the other of said housing ends, an impeller and a baffle plate within said housing, said impeller being between said inlet and said baffle plate, said baffle plate being between said outlet and said impeller, a shaft extending through said impeller, said shaft having one end thereof journaled in said plate, said impeller being mounted on said shaft for rotation in said housing with said shaft, means for connecting said baffle plate to said housing and spacing said baffle plate from said housing, said connecting and spacing means and baffle plate including means for changing the rotary motion of the fluid leaving said impeller into radially inwardly flow between said baffle plate and said outlet, said impeller being also spaced from said housing, whereby fluid flows into said inlet and engages said impeller adjacent the center thereof and flows radially outwardly of said impeller and over the periphery of and radially inwardly of said baffle plate and into said outlet, said baffle plate having opposite sides, one side thereof facing said impeller, the other side thereof facing said other housing end and said outlet, said changing means including a plurality of vanes extending from adjacent to said shaft radially outwardly therefrom, said vanes being positioned between said baffle plate and said other housing end, said connecting and spacing means including distal end portions of said vanes, said distal end vane portions being between said baffle plate and said housing, said distal end portions of each said vanes include a curved surface extending from the vane to adjacent said housing, said curved surfaces of said vanes facing the direction of rotation of said impeller, said pump being bidirectional, said impeller having vanes extending radially from said shaft, and said distal end portions of each of said vanes including a pair of oppositely facing curved surfaces extending from the vane to adjacent to said housing.

4. A pump comprising a pump housing having opposite ends, an inlet in one of said housing ends, an outlet in the other of said housing ends, an impeller within said housing adjacent said inlet, a baffle plate positioned between said impeller and said outlet, a plurality of radially extending vanes between said baffle plate and said housing, said vanes having distal ends including means for altering the direction of flow of fluid past said vane from a circumferential to a radial direction, said altering means including curved surfaces adjacent to said housing, said curved surfaces facing in the direction of rotation of said impeller a shaft extending through said impeller, said shaft being journaled in said plate and said impeller being mounted on said shaft for rotation therewith, a pump casing of generally circular cross-section, and motor means drivingly coupled to said impeller, said housing and said baffle plate, and said motor each having wall-portions of generally circular cross-section and being dimensioned to be received within said casing, whereby, said housing and said baffle plate, and said motor can be stacked and inserted in said casing, said casing including means for maintaining said last mentioned items therein.

5. The pump of claim 4 wherein said maintaining means includes a crimped end of said casing.

6. A pump comprising a pump housing, said housing having opposite ends, an inlet in one of said housing ends, an outlet in the other of said housing ends, an impeller and a baffle plate within said housing, said impeller being between said inlet and said baffle plate, said baffle plate being between said outlet and said impeller, a shaft extending through said impeller, said shaft having one end thereof journaled in said plate, said impeller being mounted on said shaft for rotation in said housing with said shaft, means for connecting said baffle plate to said housing and spacing said baffle plate from said housing, said connecting and spacing means and baffle plate including means for changing the rotary motion of the fluid leaving said impeller into radially inwardly flow between said baffle plate and said outlet, said changing means including curved surfaces adjacent to said housing, said curved surfaces facing in the direction of rotation of said impeller, said impeller being also spaced from said housing, whereby fluid flows into said inlet and engages said impeller adjacent the center thereof and flows radially outwardly of said impeller and over the periphery of and radially inwardly of said baffle plate and into said outlet.

7. The pump of claim 6 wherein said baffle plate has opposite sides, one side thereof facing said impeller, the other side thereof facing said other housing end and said outlet, said changing means including a plurality of vanes extending from adjacent to said shaft radially outwardly therefrom, said vanes being positioned between said baffle plate and said other housing end.

8. The pump of claim 7 wherein said one side of said baffle plate is generally planar, said impeller having opposite sides, one of said impeller sides facing said one baffle side and generally defining a planar surface, said other of said impeller sides generally defining a conical surface which extends from said planar surface at its periphery to its apex which is generally coincident with the axis of said shaft, each of said vanes having a front and back surface, said front vane surfaces being in said conical surface, said back vane surfaces being in said planar surface.

9. The pump of claim 7 wherein said connecting and spacing means including distal end portions of said vanes, said distal end vane portions being between said baffle plate and said housing.

10. The pump of claim 9 wherein said housing has a volume, said volume on said one side of said baffle plate being generally the same as said volume on the other side of said baffle plate.

11. The pump of claim 10 wherein said housing volume on both sides of said baffle plate varies with the radius of said housing measured from the axis of said shaft generally in accordance with:

$$C = \int_{d_1}^{d_2} \int_{r_1}^{r_2} 2\pi r \Delta d \Delta r$$

where $r_1$ and $r_2$ is the radius at points 1 and 2 and $d_1$ and $d_2$ is the distance measure perpendicularly from said planar surface between said planar and conical surfaces at points 1 and 2, respectively, and wherein C is a constant.

12. The pump of claim 10 wherein said vanes between said baffle plate and said housing are integral with said baffle plate.

13. The pump of claim 10 wherein said housing volume on both sides of said baffle plate varies with the radius of said housing, and cross-sections of said volume taken generally perpendicularly to the flow of fluid through said pump having generally a constant area.

14. The pump of claim 6 wherein said shaft is driven by an electric motor having a stator assembly including a stator core of magnetic material, a cavity extending through said core, a rotor mounted on said shaft for rotation in said cavity with said shaft and said impeller, and a journal, said journal being spaced from said pump by said motor, said shaft having the other end thereof supported for rotation by said journal.

15. The pump of claim 14 wherein said rotor is a hollow cylinder of magnetic material selectively magnetized to include equal numbers of alternating north and south segments, adjacent ones of said segments being of unequal circumferential length, whereby the force factor generated between said stator and said segments is radially offset from the axis of said rotor.

16. The motor of claim 14 wherein said rotor is a hollow cylinder of magnetic material selectively magnetized to include equal numbers of alternating north and south linear segments, said hollow cylinder having exterior and interior circumferential surfaces, said north linear segments having an exterior circumferential length unequal to its interior circumferential length, and said south segments having exterior circumferential lengths unequal to their interior circumferential lengths.

17. The motor of claim 16 wherein said exterior circumferential length of said north segments is greater than its said interior circumferential length, adjacent ones of said north and south linear segments having unequal mediate circumferential lengths.

18. The pump of claim 14 wherein said stator core includes a selected plurality of substantially identical laminations longitudinally stacked to form a core of selected length, a plurality of coils having selected lengths substantially equal to the selected length of said core, the selected length of said core and the number of turns of wire of said coils determining the torque of said motor whereby the torque of said motor can be selectively varied.

19. The pump of claim 18 wherein said rotor is a hollow cylinder of magnetic material selectively magnetized to include equal numbers of alternating north and south segments, the magnetic field generated between said coils and said rotor generating a force factor radially offset from the axis of said rotor.

20. The pump of claim 18 wherein said rotor assembly includes means for radially offsetting from the axis of said rotor a force vector generated between said coils and said rotor.

21. The pump of claim 14 wherein said journal is mounted in a second baffle plate of a second pump, said second pump having a second pump housing, said second housing having opposite ends, a second inlet in one of said second housing ends, a second outlet in the other of said second housing ends, a second impeller within said second housing adjacent to said second inlet, a second baffle plate within said second housing adjacent to said second outlet, said shaft extending through said second impeller, said second impeller being mounted on said shaft for rotation in said second housing with said shaft, said motor rotor and both said impellers rotating together, means for securing said second baffle plate to said second housing, said second baffle plate and impeller being spaced from said second housing, said pumps being stages of a motor driven pump combination, said inlets and outlets communicating with each other.

22. The pump of claim 21 wherein said shaft is supported only by said baffle plate and said second baffle plate.

23. The pump of claim 21 wherein said motor and pump stages are all positioned in a cylindrical tube, said tube having opposite ends, an inlet in one of said tube ends, an outlet in the other of said tube ends, means adjacent said tube ends for holding said pump and said second pump and motor in position, said inlets and outlets communicating with each other.

24. The pump of claim 23 wherein said motor rotor has a passage extending therethrough, said second outlet and said inlet communicating with said passage whereby said fluid passes through said tube inlet, said second inlet and pump and outlet, said motor rotor, said inlet and pump and outlet, and said tube outlet, said motor rotor having means in said passage for imparting rotational energy to said fluid.

25. The pump of claim 23 wherein both of said pumps comprise a plurality of pump stages.

26. The pump of claim 23 wherein at least one of said pumps comprises a plurality of pump stages.

27. The pump of claim 26, wherein each of said pump stages comprise a pump stage housing, said pump stage housing having opposite ends, a pump stage inlet in one of said pump stage housing ends, a pump stage outlet in the other of said pump stage housing ends, a pump stage impeller within said pump stage housing adjacent to said pump stage inlet, a pump stage baffle plate within said pump stage housing adjacent to said pump stage outlet, said shaft extending through said pump stage impeller, said pump stage impeller being mounted on said shaft for rotation in said pump stage housing with said shaft, said motor rotor and said impellers rotating together, means for connecting said pump stage baffle plate to said pump stage housing and spacing said pump stage baffle plate from said pump stage housing, said pump stage impeller being spaced from said pump stage housing, said pump stage connecting and spacing means and baffle plate including means for changing the rotary motion of the fluid leaving said pump stage impeller into radially inwardly flow between said pump stage baffle plate and said pump stage outlet, said inlets and outlets communicating with each other.

28. The pump of claim 26 wherein said shaft is supported only by said baffle plates.

29. A pump comprising a pump housing, said housing having opposite ends, an inlet in one of said housing ends, an outlet in the other of said housing ends, an impeller and a baffle plate within said housing, said impeller being between said inlet and said baffle plate, said baffle plate being between said outlet and said impeller, a shaft extending through said impeller, said shaft having one end thereof journaled in said plate, said impeller being mounted on said shaft for rotation in said housing with said shaft, means for connecting said baffle plate to said housing and spacing said baffle plate from said housing, said connecting and spacing means and baffle plate including means for changing the rotary motion of the fluid leaving said impeller into radially inwardly flow between said baffle plate and said outlet, said impeller being also spaced from said housing, whereby fluid flows into said inlet and engages said impeller adjacent the center thereof and flows radially outwardly of said impeller and over the periphery of and radially inwardly of said baffle plate and into said outlet, said shaft being driven by an electric motor having a stator assembly including a stator core of magnetic material, a cavity extending through said core, a rotor mounted on said shaft for rotation in said cavity with said shaft and said impeller, and a journal, said journal being spaced from said pump by said motor, said shaft having the other end thereof supported for rotation by said journal, said stator assembly including a plurality of magnetic poles, said rotor being selectively magnetized to have a plurality of magnetic sectors of alternate polarity, a source of direct current operating potential, commutating means for alternately and sequentially energizing predetermined ones of said poles in synchronism with the rotation of said rotor, said commutating means including a solid state switching circuit connected between said source of operating potential and said poles, said switching circuit including a series connected resistor and capacitor timing circuit responsive to the self-induced counter voltage in said poles for causing said switching circuit to switch in response to rotational movement in position of said rotor with respect to said poles.

30. The pump of claim 29 wherein said switching circuit includes a multivibrator having a predetermined free-running frequency, said control means including a biasing circuit coupled to said poles, said biasing circuit being responsive to said counter voltage to cause switching of said multivibrator in synchronism with the rotation when said rotor is rotating in a clockwise or counter-clockwise direction and the rotational position of said rotor and at a frequency different from said free-running frequency.

31. The pump of claim 30 wherein said switching circuit includes alternately conductive first and second switching elements, each of said switching elements being connected to preselected different ones of said poles, predetermined ones of said coils being energized in response to conductive states of said first and second switching elements, respectively, the electric field generated by said poles in response to the selected energization of alternate ones of said poles being a changing magnetic field, rotational torque being applied to said rotor by said changing magnetic field, said biasing circuit including at least one timing circuit having a predetermined time constant and being coupled to said switching elements and said poles, said free running frequency being determined by said time constant, said time constant being altered by said counter voltage, said switching elements being first and second transistors, respectively, said transistors having their collector-emitter circuits connected electrically in series with the said predetermined ones of said coils, there being one set timing circuit connected between the collector of said first transistor and the base of said second transistor and including a series connected resistor and capacitor, and a second timing circuit connected between the collector or said second transistor and the base of said first transistor and including a series connected resistor and capacitor, said first and second transistors being rendered conductive in response to said counter voltage generated in said predetermined ones of said coils connected thereto, respectively, said first and second timing circuits being shunted in response to said conductive states of said second and first transistors, respectively, whereby said frequency of said multivibrator is altered in response to said counter voltage.

32. The pump of claim 31 wherein said journal is mounted in a second baffle plate of a second pump, said second pump having a second pump housing, said second housing having opposite ends, a second inlet in one of said second housing ends, a second outlet in the other of said second housing ends, a second impeller within said second housing adjacent to said second inlet, a second baffle plate within said second housing adjacent to said second outlet, said shaft extending through said second impeller, said second impeller being mounted on said shaft for rotation in said second housing with said shaft, said motor rotor and both said impellers rotating together, means for securing said second baffle plate to said second housing, said second baffle plate, and impeller being spaced from said second housing, said pumps being stages of a motor driven pump combination, said inlets and outlets communicating with each other.

33. The pump of claim 32 wherein said housing has a volume, said volume on said one side of said baffle plate being generally the same as said volume on the other side of said baffle plate.

34. The pump of claim 33 wherein said baffle plate has opposite sides, one side thereof facing said impeller, the other side thereof facing said other housing end and said outlet, said changing means including a plurality of vanes extending from adjacent to said shaft radially outwardly therefrom, said vanes being positioned between said baffle plate and said other housing end.

35. The pump of claim 34 wherein said connecting and spacing means including distal end portions of said vanes, said distal end vane portions being between said baffle plate and said housing.

36. The pump of claim 35 wherein said vanes between said baffle plate and said other housing and are integral with said baffle plate, and said connecting and spacing means includes slots in said housing and portions of said vanes positioned in said slots.

37. The pump of claim 36 wherein said housing volume on both sides of said baffle plate varies with the radius of said housing, and cross-sections of said volume taken generally perpendicularly to the flow of fluid through said pump having generally a constant area.

38. The pump of claim 33 wherein said stator core includes a selected plurality of substantially identical laminations longitudinally stacked to form a core of selected length, the length of the sides of said bobbins being substantially equal to the selected length of said core, the torque of said motor being proportional to the number of turns of wire on said bobbins and the length of said core whereby the torque of said motor can be selectively varied thereby.

39. The pump of claim 38 wherein said rotor is a hollow cylinder of magnetic material selectively magnetized to include an equal number of alternating north and south segments, adjacent ones of said segments being of unequal circumferential length, whereby the force factor generated between said poles and said segments is radially offset from the axis of said motor.

40. The pump of claim 39 wherein said shaft is supported only by said baffle plate and said second baffle plate.

41. The pump of claim 40 wherein said motor and pump stages are all positioned in a cylindrical tube, said tube having opposite ends, an inlet in one of said tube ends, an outlet in the other of said tube ends, means adjacent said tube ends for holding said pump and said second pump and motor in position, said inlets and outlets communicating with each other.

42. The pump of claim 41 wherein said motor rotor has a passage extending therethrough, said second outlet and said inlet communicating with said passage whereby said fluid passes through said tube inlet, said second inlet and pump and outlet, said motor rotor, said inlet and pump and outlet, and said tube outlet, said motor rotor having means in said passage for imparting rotational energy to said fluid.

43. The pump of claim 42 wherein both of said pumps comprise a plurality of pump stages.

44. The pump of claim 43 wherein at least one of said pumps comprises a plurality of pump stages.

45. The pump of claim 44 wherein each of said pump stages comprise a pump stage housing, said pump stage housing having opposite ends, a pump stage inlet in one of said pump stage housing ends, a pump stage outlet in the other of said pump stage housing ends, a pump stage impeller within said pump stage housing adjacent to said pump stage inlet, a pump stage baffle plate within said pump stage housing adjacent to said pump stage outlet, said shaft extending through said pump stage impeller, said pump stage impeller being mounted on said shaft for rotation in said pump stage housing with said shaft, said motor rotor and said impellers rotating together, means for connecting said pump stage baffle plate to said pump stage housing and spacing said pump stage baffle plates from said pump stage housing, said pump stage impeller being spaced from said pump stage housing, said pump stage connecting and spacing means and baffle plate including means for changing the rotary motion of the fluid leaving said pump stage impeller into radially inwardly flow between said pump stage baffle plate and said pump stage outlet said inlets and outlets communicating with each other.

* * * * *